United States Patent

[11] 3,571,608

[72] Inventor Edward T. E. III Hurd
Cinnaminson, N.J.
[21] Appl. No. 813,550
[22] Filed Apr. 4, 1969
[45] Patented Mar. 23, 1971
[73] Assignee Honeywell Inc.,
Minneapolis, Minn.

[54] PROTECTIVE CIRCUIT
7 Claims, 2 Drawing Figs.

[52] U.S. Cl. .......... 307/93, 317/31, 307/127, 320/25
[51] Int. Cl. .......... H02h 1/04
[50] Field of Search .......... 307/93, 94, 127, 130; 317/31, 43, 47, 50; 320/25, 34, 40

[56] References Cited

UNITED STATES PATENTS

| | | | |
|---|---|---|---|
| 3,048,718 | 8/1962 | Starzec et al. | 317/31UX |
| 3,079,532 | 2/1963 | Segrest | 317/31 |
| 3,123,759 | 3/1964 | Grey | 320/40 |
| 3,389,324 | 6/1968 | Battlman | 320/25 |
| 3,448,342 | 6/1969 | Jacobs | 317/31X |

*Primary Examiner*—Robert K. Schaefer
*Assistant Examiner*—H. J. Hohauser
*Attorneys*—Arthur H. Shawson, Lockwood D. Burton and George E. Bodenstein

ABSTRACT: The collector and emitter of a first transistor, which is normally biased on by a collector-base resistor, are connected, respectively, to positive circuit input and output terminals. The transistor base is connected to joined negative circuit input and output terminals through the collector-emitter path of a second transistor having its base connected through a zener diode to the positive input terminal. This diode breaks down and turns on the second transistor, which turns off the first transistor, whenever the value of the voltage between the input terminals exceeds a value determined by the zener rating of the diode. A pair of diodes connected across the series combination of an emitter resistor and the base-emitter junction of the first transistor limits the output current to a predetermined maximum value. A diode connected between the collector and emitter of the second transistor clamps the output voltage substantially to zero in the event that the polarity of the voltage between the input terminals becomes reversed.

INVENTOR.
EDWARD T. E. HURD III
BY
AGENT.

PROTECTIVE CIRCUIT

BACKGROUND OF THE INVENTION

The present invention relates generally to electrical circuits which provide protection for associated electrical equipment, and relates specifically to circuits of this type which employ only static elements, such as semiconductor devices and resistors. More specifically, the invention relates to circuits as just defined which protect equipment, powered from a source or supply of electrical power, from the effects of excessive values of supply voltage, and from the effects of supply voltage polarity reversal.

Still more specifically, the invention relates to circuits as identified above which are arranged to be connected between the equipment to be protected and the source of power therefor, and which prevent the equipment from receiving excessive or reversed polarity voltages or currents. Even more specifically, the invention relates to circuits of the last mentioned type which operate to cut off the supply of power to the protected equipment when the supply voltage exceeds a predetermined value and/or reverses in polarity, and which limit the value of current which can pass to and through said equipment.

Protective circuits of the foregoing type have been known in the past, as in evidenced, for example, by the disclosures of the U.S. Starzec et al. Pat. No. 3,048,718 and the patents cited therein. However, all of the previously known protective circuit arrangements of which I am aware have had one or more undesirable characteristics, such as that of drawing current from the system or network in which they are installed, and that of introducing into the network an impedance which varies with varying network conditions, even when all conditions are normal. Such characteristics are particularly disadvantageous when the protective circuit is connected in a series loop circuit in which there flows a current of a magnitude which is a function of the value of a variable, such as the loop circuit including a transmitter, a receiver, and a power supply as used in known control systems.

SUMMARY OF THE INVENTION

Accordingly, it is an object of the present invention to provide an improved protective circuit, for connection between equipment to be protected and its source of electrical power, which does not itself draw any current, and does not introduce any significant impedance into the network including it, when conditions are normal. It is another object of the invention to provide such an improved circuit which rapidly cuts off the voltage and current to the protected equipment or load, such as a device in a loop circuit as referred to hereinbefore, whenever the value of the supply voltage for the load exceeds a predetermined maximum value. It is a further object of the invention to provide such an improved circuit in which the addition of relatively simple means, such as diodes, causes the circuit to prevent the value of the load current from exceeding a predetermined value, and to cut off the voltage and current to the load upon reversal of the polarity of the supply voltage.

In accomplishing these and other desirable objects, the novel circuit according to the invention employs a transistor which is connected between input or supply terminals and output or load terminals so that the current which flows from the power source and through the protected apparatus or load flows into the transistor collector and out of the emitter. In this way, the transistor does not introduce any significant impedance into the network in which it is used, and hence does not affect the voltage regulation in the network. The transistor is normally turned on or kept conductive solely by means of a collector-to-base biasing resistor.

Transistor turnoff for excessive input voltage values is provided by a normally nonconductive arrangement including a normally open switch connected between the transistor base and one input terminal, and including a normally nonconductive voltage sensitive device connected between the switch and the other input terminal. As a result, the circuit does not draw any current as long as the input voltage does not exceed a critical value dependent upon the rating of the voltage sensitive device. Any input voltage in excess of this value causes the voltage sensitive device to become conductive and to close the switch. This turns off the transistor. The switch may be a second transistor, and the voltage sensitive device may be a Zener diode.

The current flow through the first-mentioned transistor and the load is advantageously kept from rising above a predetermined value by means of voltage-sensitive devices, such as diodes, which clamp the voltage drop across a resistor through which said current flows. The output voltage is clamped substantially to zero, upon reversal of the input voltage polarity, by a voltage-sensitive device, such as a diode, connected between the transistor base and the opposite input terminal.

BRIEF DESCRIPTION OF THE DRAWING

A better understanding of the present invention may be had from the following detailed description when read in connection with the accompanying drawing, wherein.

DESCRIPTION OF THE PREFERRED EMBODIMENT

Figure 1:
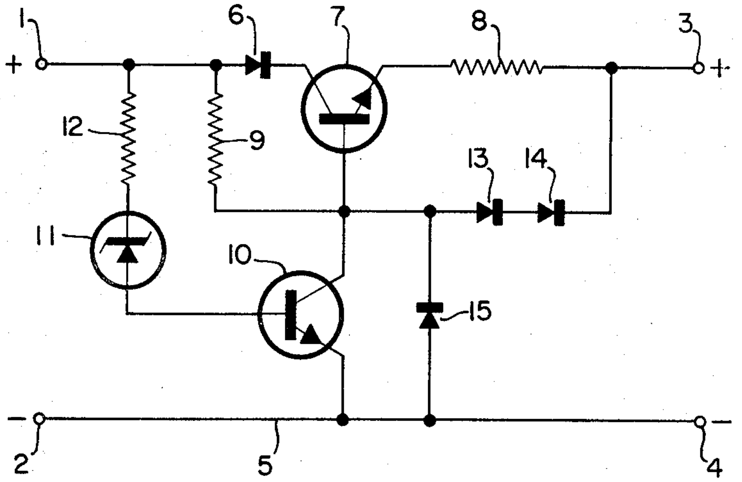
FIG. 1 is a schematic diagram of a protective circuit according to the present invention.

The protective circuit or apparatus of FIG. 1 includes positive and negative input or supply terminals 1 and 2, respectively, and positive and negative output or load terminals 3 and 4, respectively. The negative supply and load terminals 2 and 4 are directly connected together by a conductor 5. The terminal 1 is connected through a diode 6 to the collector of an NPN transistor 7, the emitter of which is connected through a resistor 8 to the terminal 3.

A resistor 9 is connected between the terminal 1 and the base of the transistor 7. This base is also connected to the collector of an NPN transistor 10, the emitter of which is connected to the conductor 5. The base of the transistor 10 is connected through a Zener diode 11 and a resistor 12 to the terminal 1.

As previously noted, a protective circuit of the type of the FIG. 1 circuit is intended for connection between a device to be protected, or load, and the source of electrical power therefor. Thus, the FIG. 1 circuit is normally connected so that a source of power supplies a voltage between the terminals 1 and 2 and causes a current to flow through the FIG. 1 apparatus and through a load or device connected between the terminals 3 and 4. A specific example of such connections is described hereinafter in connection with FIG. 2.

In the FIG. 1 apparatus as thus far described, the diode 11 is nonconductive as long as the value of the voltage appearing between the terminals 1 and 2 is below a predetermined value established by the rating of the diode 11. Under this so-called normal condition, the transistor 10 is nonconductive or off, and the resistor 9 forward biases the base-emitter junction of the transistor 7 so that the latter is caused to be in the conductive or on condition. Accordingly, the transistor 7 allows current to flow substantially unimpeded from the terminal 1 to the terminal 3.

As a result of the disclosed connections, the transistor 7 does not introduce any significant impedance between the terminals 1 and 3 when the aforesaid normal condition prevails. Consequently, the transistor 7 desirably does not cause the voltage between the terminals 3 and 4 to be dependent upon the impedance of the load connected between these terminals, and hence does not affect the regulation of the system in which the FIG. 1 apparatus is used. As a further result of the disclosed connections, the FIG. 1 apparatus desirably does not draw any current between the terminals 1 and 2 when the aforesaid normal condition prevails, and hence desirably does not in any way disturb the magnitude of current which passes through the apparatus under said normal condition.

If the voltage between the terminals 1 and 2 rises above the aforesaid predetermined value, the diode 11 becomes conductive and forward biases the transistor 10 so that the latter is turned on and driven to saturation. This clamps the base of the transistor 7 to the potential of the conductor 5, which turns off this transistor. As a result, the voltage between the terminals 3 and 4 is instantly reduced to zero, as is desired. The resistor 12 limits the value of the current which can flow into the base of the transistor 10.

The foregoing state will prevail until the voltage between the terminals 1 and 2 drops below said predetermined value. At that time, the diode 11 and the transistor 10 will become nonconductive, the transistor 7 will be allowed to assume its normally conductive state, and the voltage between the terminals 3 and 4 will reappear.

The apparatus of FIG. 1 also provides a desirable current-limiting action. This action is obtained by connecting diodes 13 and 14 in series across the series combination of the resistor 8 and the base-emitter junction of the transistor 7. This arrangement limits the maximum value which the sum of the voltage drop across the resistor 8 and the base-emitter voltage drop of the transistor 7 can have to the value of the sum of the forward biased PN junction voltage drops of the diodes 13 and 14. Thus, this arrangement limits the maximum value of current which can flow between the terminals 3 and 4 to that value which causes the first-mentioned voltage sum to equal the second-mentioned voltage sum.

Accordingly, in practice, the resistance of the resistor 8 and the types of diodes for use as the diodes 13 and 14 are selected so that, for the maximum current value that is to be permitted to flow, the resistor 8 produces a voltage drop which, when added to the base-emitter voltage drop of the transistor 7, gives a total voltage equal to the sum of the voltage drops across the diodes 13 and 14.

It is convenient to employ two diodes, as shown, since one of these diodes can be selected so that its voltage drop equal the base-emitter voltage drop of the transistor 7, thereby allowing the establishment of the maximum current value to be effected merely by matching the voltage drops of the resistor 8 and the second of the two diodes. A single diode can, of course, be used in place of the two diodes 13 and 14 if values and parameters permit this.

The apparatus of FIG. 1 also provides a desirable protective action, for both itself and for the equipment connected between the output terminals 3 and 4, in the event that the polarity of the voltage appearing between the input terminals 1 and 2 reverses from the normal polarity indicated in FIG. 1. This action is obtained by connecting a diode 15 between the conductor 5 and the base of the transistor 7. As long as any voltage appearing between the terminals 1 and 2 has the polarity indicated in FIG. 1, the diode 15 remains nonconducting. A reversal of this polarity causes the diode 15 to clamp the base of the transistor 7 in a reversed bias mode, and thereby to turn off this transistor. This effectively clamps the voltage between the terminals 3 and 4 essentially to zero, thereby protecting the associated equipment from the effects of the polarity reversal. At the same time, the diode 6 protects the collector-base junction of the transistor 7 from becoming forward biased.

Figure 2:
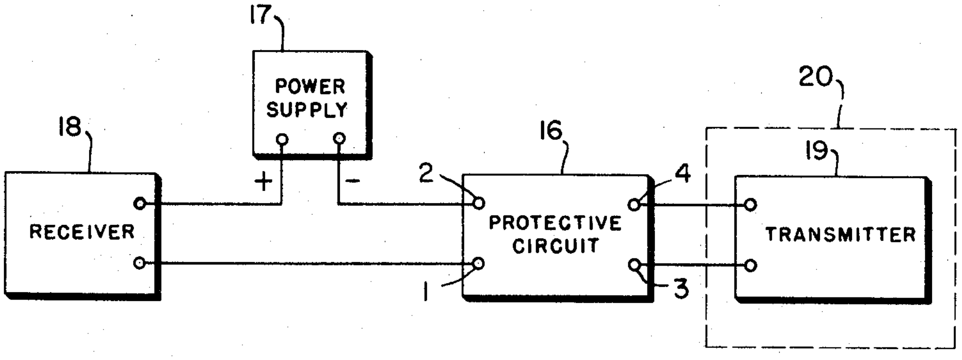
FIG. 2 is a block diagram illustrating a typical arrangement in which the circuit of FIG. 1 may be used.

FIG. 2 illustrates an example of an arrangement of the kind in which the protective circuit or apparatus of FIG. 1 can advantageously be used. In the FIG. 2 arrangement, the FIG. 1 circuit is shown at 16 as being interconnected with the power supply 17, receiver 18, and transmitter 19 of a typical series loop control system as referred to hereinbefore. The transmitter 19 is shown as being physically located in an area 20, and it is assumed for the purposes of this illustration that the area 20 is a so-called hazardous area. By this term is meant an area in which disasterous results would be almost certain to occur upon the application to the transmitter 19 of the excessive or reversed polarity voltages or currents which would be produced upon the occurrence of certain malfunctioning of the power supply 17 and/or the receiver 18 and their interconnections.

Accordingly, the purpose of providing the circuit 16 in the FIG. 2 system is to protect the transmitter 19 from receiving such excessive or reversed polarity voltages and currents. To this end, one terminal of the power supply 17 is connected to one terminal of the receiver 18, and the remaining terminals of these two units are connected to the input terminals 1 and 2 of the circuit 16. This places the output of the power supply 17 in series with the receiver 18 across the input of the circuit 16. Further, the terminals of the transmitter 19 are connected to the output terminals 3 and 4 of the circuit 16.

The foregoing connections place the circuit 16 in the series loop circuit containing the power supply 17, the receiver 18, and the transmitter 19 so that the circuit 16 lies between the transmitter 19 and the means which supply it with electrical power—namely, the series combination of the power supply 17 and the receiver 18. Thus, the circuit 16 is placed in such a position that the control current of the series loop control system passes through the circuit 16, and in such a position that the latter protects the transmitter 19 from receiving the aforementioned excessive or reversed polarity voltages and currents, no matter what their origin. The circuit 16 thus functions as a so-called intrinsic safety barrier with respect to the transmitter 19. The specific manner in which the circuit 16 will operate to provide this protective action should be apparent from the description of the FIG. 1 circuit given herein.

In those applications where an exceptionally high degree of protection and reliability are required, it may be desirable to employ a plurality of the FIG. 1 circuits connected in series between the apparatus to be protected and its source of electrical power. This amounts to placing a plurality of the FIG. 1 circuits within the block 16 in FIG. 2, and connecting said circuits in series between the input and output terminals of the block 16. This procedure minimizes the chance that the protective action will be lost or impaired as a result of the failure of one or more of the protective circuit components.

In conclusion, it is seen that the improved protective circuit in accordance with the present invention is of relatively simple construction, and operates without interfering with the values of the current passing through it and the voltage applied to it as long as these values are below predetermined limits and are of the correct polarity. It is also seen that this desirable construction and mode of operation are obtained by virtue of the use of the combination of a transistor connected to pass current from collector to emitter, transistor turnon biasing means connected only between the transistor collector and base, and control means for the transistor which is normally nonconductive.

I claim:

1. A protective circuit comprising:
- a pair of input terminals for connection across a source of voltage;
- a pair of output terminals for connection across a load device;
- a transistor having a collector, an emitter, and a base;
- first means connecting one of said input terminals to one of said output terminals;
- second means connecting the collector-emitter path of said transistor between the others of said input and output terminals so that current flowing between said output terminals flows into said collector and out of said emitter;
- transistor turnon bias means connected between said collector and said base;
- normally open switch means connected between said base and said one input terminal and operative to turn off said transistor when closed;
- voltage sensitive means connected between said other input terminal and said switch means to close the latter when the voltage between said input terminals exceeds a predetermined value;
- a resistor included in said second connecting means and having one end connected to said emitter so that current flowing between said output terminals flows through said resistor; and a diode connected between the remaining end of said resistor and said base and oriented for current conduction in a direction away from said base.

2. Apparatus as specified in claim 1, wherein said switch means is a second transistor having a collector-emitter path connected between said base of the first-mentioned transistor and said one of said input terminals, and having a base connected to said voltage sensitive means.

3. Apparatus as specified in claim 1, wherein said voltage sensitive means is a Zener diode connected between said other input terminal and said switch means.

4. A protective circuit comprising:

a pair of input terminals for connection across a source of voltage;

a pair of output terminals for connection across a load device;

a transistor having a collector, an emitter, and a base;

first means connecting one of said input terminals to one of said output terminals;

second means connecting the collector-emitter path of said transistor between the others of said input and output terminals so that current flowing between said output terminals flows into said collector and out of said emitter;

transistor turnon bias means connected between said collector and said base;

normally open switch means connected between said base and said one input terminal and operative to turn off said transistor when closed;

voltage sensitive means connected between said other input terminal and said switch means to close the latter when the voltage between said input terminals exceeds a predetermined valve; and a diode connected between said base and said one input terminal and oriented for current conduction in a direction toward said base.

5. Apparatus as specified in claim 4, wherein said second connecting means includes a resistor having one end connected to said emitter so that current flowing between said output terminals flows through said resistor, and wherein a diode is connected between the remaining end of said resistor and said base and is oriented for current conduction in a direction away from said base.

6. Apparatus as specified in claim 4, wherein said switch means is a second transistor having a collector-emitter path connected between said base of the first-mentioned transistor and said one of said input terminals, and having a base connected to said voltage sensitive means.

7. Apparatus as specified in claim 4, wherein said voltage sensitive means is a Zener diode connected between said other input terminal and said switch means.